United States Patent
Terry et al.

(10) Patent No.: US 9,253,789 B2
(45) Date of Patent: *Feb. 2, 2016

(54) DYNAMIC CHANNEL QUALITY MEASUREMENT PROCEDURE IMPLEMENTED IN A WIRELESS DIGITAL COMMUNICATION SYSTEM TO PRIORITIZE THE FORWARDING OF DOWNLINK DATA

(71) Applicant: Intel Corporation, Santa Clara, CA (US)

(72) Inventors: Stephen E. Terry, Northport, NY (US); Stephen G. Dick, Nesconset, NY (US); James M. Miller, Verona, NJ (US); Eldad M. Zeira, Huntington, NY (US); Ariela Zeira, Huntington, NY (US)

(73) Assignee: Intel Corporation, Santa Clara, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/782,664

(22) Filed: Mar. 1, 2013

(65) Prior Publication Data

US 2013/0176970 A1 Jul. 11, 2013

Related U.S. Application Data

(63) Continuation of application No. 13/534,561, filed on Jun. 27, 2012, now Pat. No. 8,437,702, which is a continuation of application No. 13/042,134, filed on Mar. 7, 2011, now Pat. No. 8,219,036, which is a (Continued)

(51) Int. Cl.
*H04W 72/08* (2009.01)
*H04W 72/12* (2009.01)

(Continued)

(52) U.S. Cl.
CPC ............ *H04W 72/085* (2013.01); *H04B 17/24* (2015.01); *H04B 17/309* (2015.01);

(Continued)

(58) Field of Classification Search
None
See application file for complete search history.

(56) References Cited

U.S. PATENT DOCUMENTS 5,375,123 A 12/1994 Andersson et al.
5,428,816 A 6/1995 Barnett et al.

(Continued)

FOREIGN PATENT DOCUMENTS

CN 1277764 12/2000
EP 0 717 580 6/1996

(Continued)

OTHER PUBLICATIONS

Office Action from U.S. Appl. No. 13/534 561 mailed Sep. 13, 2012, 18 pages.

(Continued)

*Primary Examiner* — Gregory Sefcheck
*Assistant Examiner* — Jenkey Van
(74) *Attorney, Agent, or Firm* — Blakely, Sokoloff, Taylor & Zafman LLP

(57) ABSTRACT

A wireless digital communication system includes a base station in communication with a plurality of user equipment mobile terminals (UEs). The system prioritizes the forwarding of blocks of downlink data to designated ones of the UEs. The system employs adaptive modulation and coding (AM&C) to achieve improved radio resource utilization and provides optimum data rates for user services. Blocks of downlink (DL) data are received by the base station which requests downlink (DL) channel quality measurements only from those mobile terminals (UEs) with pending downlink transmissions. The UEs respond to the request by measuring and reporting DL channel quality to the base station, which then allocates resources such that the UEs will make best use of radio resources. The base station notifies the UEs of the physical channel allocation indicating the modulation/coding rate and allocated slots followed by transmission of blocks of downlink data which are transmitted to the UEs.

20 Claims, 2 Drawing Sheets

Related U.S. Application Data continuation of application No. 12/648,470, filed on Dec. 29, 2009, now Pat. No. 7,904,026, which is a continuation of application No. 11/656,647, filed on Jan. 23, 2007, now Pat. No. 7,639,989, which is a continuation of application No. 10/768,312, filed on Jan. 30, 2004, now Pat. No. 7,171,163, which is a continuation of application No. 10/029,569, filed on Dec. 21, 2001, now Pat. No. 6,810,236.

(60) Provisional application No. 60/290,877, filed on May 14, 2001.

(51) Int. Cl.
*H04B 17/24* (2015.01)
*H04B 17/309* (2015.01)
*H04B 17/382* (2015.01)
*H04L 1/00* (2006.01)

(52) U.S. Cl.
CPC ........... *H04B 17/382* (2015.01); *H04L 1/0009* (2013.01); *H04L 1/0026* (2013.01); *H04L 1/0027* (2013.01); *H04W 72/1231* (2013.01); *H04L 1/0003* (2013.01); *H04W 72/1278* (2013.01)

(56) References Cited

U.S. PATENT DOCUMENTS

| | | |
|---|---|---|
| 5,701,294 A * | 12/1997 | Ward et al. .......... 370/252 |
| 5,764,648 A | 6/1998 | Yamane et al. |
| 5,778,316 A | 7/1998 | Persson et al. |
| 5,828,672 A | 10/1998 | Labonte et al. |
| 5,862,451 A | 1/1999 | Grau et al. |
| 5,867,478 A | 2/1999 | Baum et al. |
| 5,940,439 A | 8/1999 | Kleider et al. |
| 5,949,790 A | 9/1999 | Pehkonen et al. |
| 5,960,335 A * | 9/1999 | Umemoto et al. ......... 455/226.2 |
| 6,101,179 A | 8/2000 | Soliman |
| 6,115,406 A | 9/2000 | Mesecher |
| 6,137,991 A | 10/2000 | Isaksson |
| 6,144,653 A | 11/2000 | Persson et al. |
| 6,167,031 A * | 12/2000 | Olofsson .............. H04L 1/0009 370/252 |
| 6,208,663 B1 | 3/2001 | Schramm et al. |
| 6,298,035 B1 | 10/2001 | Heiskala |
| 6,301,265 B1 | 10/2001 | Kleider et al. |
| 6,307,867 B1 | 10/2001 | Roobol et al. |
| 6,330,288 B1 | 12/2001 | Budka et al. |
| 6,347,071 B1 | 2/2002 | Cupo et al. |
| 6,366,601 B1 | 4/2002 | Ghosh et al. |
| 6,373,877 B1 | 4/2002 | Mesecher |
| 6,374,118 B1 | 4/2002 | Toskala et al. |
| 6,381,231 B1 | 4/2002 | Silventoinen et al. |
| 6,381,445 B1 | 4/2002 | Ue et al. |
| 6,414,946 B1 | 7/2002 | Satou et al. |
| 6,449,462 B1 | 9/2002 | Gunnarsson et al. |
| 6,498,936 B1 | 12/2002 | Raith |
| 6,545,997 B1 | 4/2003 | Bohnke et al. |
| 6,567,665 B1 | 5/2003 | Kissee |
| 6,584,092 B1 | 6/2003 | Sudo |
| 6,587,697 B2 | 7/2003 | Terry et al. |
| 6,597,697 B1 | 7/2003 | Petersen |
| 6,603,797 B1 | 8/2003 | Zeira et al. |
| 6,615,054 B2 | 9/2003 | Terry et al. |
| 6,631,123 B1 | 10/2003 | Jiang et al. |
| 6,650,624 B1 | 11/2003 | Quigley et al. |
| 6,700,881 B1 | 3/2004 | Kong et al. |
| 6,707,808 B1 | 3/2004 | Vedrine |
| 6,721,569 B1 | 4/2004 | Hashem et al. |
| 6,745,045 B2 | 6/2004 | Terry et al. |
| 6,760,598 B1 | 7/2004 | Kurjenniemi |
| 6,791,960 B1 | 9/2004 | Song |
| 6,801,513 B1 * | 10/2004 | Gibbons et al. .......... 370/337 |
| 6,810,236 B2 | 10/2004 | Terry et al. |
| 6,850,540 B1 | 2/2005 | Peisa et al. |
| 6,868,277 B1 * | 3/2005 | Cerwall et al. ............. 455/509 |
| 6,909,901 B2 | 6/2005 | Terry et al. |
| 6,928,065 B2 | 8/2005 | Logalbo et al. |
| 6,934,340 B1 | 8/2005 | Dollard |
| 6,947,490 B1 | 9/2005 | Edwards et al. |
| 6,952,591 B2 | 10/2005 | Budka et al. |
| 6,958,989 B1 | 10/2005 | Dick et al. |
| 6,963,540 B2 | 11/2005 | Choi |
| 6,970,708 B1 | 11/2005 | Raith |
| 6,987,746 B1 | 1/2006 | Song |
| 6,990,087 B2 | 1/2006 | Rao et al. |
| 6,993,343 B2 | 1/2006 | Yoshii et al. |
| 7,035,234 B2 | 4/2006 | Toskala et al. |
| 7,089,015 B2 | 8/2006 | Fukui |
| 7,116,653 B1 | 10/2006 | Bemmer et al. |
| 7,127,256 B2 | 10/2006 | Terry et al. |
| 7,133,353 B2 | 11/2006 | Sourour et al. |
| 7,171,163 B2 | 1/2007 | Terry et al. |
| 7,209,711 B2 | 4/2007 | Terry et al. |
| 7,227,854 B2 | 6/2007 | Kim et al. |
| 7,236,474 B2 | 6/2007 | Seo et al. |
| 7,260,405 B2 | 8/2007 | Kim et al. |
| 7,274,947 B2 | 9/2007 | Koo et al. |
| 7,460,877 B2 | 12/2008 | Terry et al. |
| 7,639,989 B2 | 12/2009 | Terry et al. |
| 7,904,026 B2 | 3/2011 | Terry et al. |
| 8,219,036 B2 | 7/2012 | Terry et al. |
| 2002/0110101 A1 * | 8/2002 | Gopalakrishnan .. H04J 13/0048 370/335 |
| 2003/0123414 A1 * | 7/2003 | Tong et al. ................ 370/337 |
| 2009/0310588 A1 | 12/2009 | Padovani et al. |

FOREIGN PATENT DOCUMENTS

| | | |
|---|---|---|
| EP | 0717580 | 6/1996 |
| EP | 0 755 133 | 1/1997 |
| EP | 0 899 906 | 3/1999 |
| EP | 0899906 | 3/1999 |
| EP | 0944201 | 9/1999 |
| EP | 0 964 540 | 12/1999 |
| EP | 0 986 282 | 3/2000 |
| EP | 1 024 622 | 8/2000 |
| EP | 1 083 706 | 3/2001 |
| GB | 2266433 | 10/1993 |
| GB | 2354910 | 4/2001 |
| JP | 08-149132 | 6/1996 |
| JP | 2000-151639 | 5/2000 |
| JP | 2001-515306 | 9/2001 |
| JP | 2002-527938 | 8/2002 |
| JP | 2002-538697 | 11/2002 |
| KR | 20010038996 | 5/2001 |
| KR | 20010073145 | 7/2001 |
| RU | 2122288 | 11/1998 |
| RU | 2129761 | 4/1999 |
| RU | 2138915 | 9/1999 |
| RU | 2138926 | 9/1999 |
| RU | 2141726 | 11/1999 |
| RU | 2197779 | 1/2003 |
| TW | 192647 | 10/1993 |
| WO | 97/22218 | 6/1997 |
| WO | WO-9722218 | 6/1997 |
| WO | 97/37457 | 10/1997 |
| WO | 98/03030 | 1/1998 |
| WO | 98/21910 | 5/1998 |
| WO | 99/10991 | 3/1999 |
| WO | 99/12302 | 3/1999 |
| WO | 99/18685 | 4/1999 |
| WO | 99/50984 | 10/1999 |
| WO | WO-00-21235 | 4/2000 |
| WO | WO 00/21235 | 4/2000 |
| WO | 00/51390 | 8/2000 |
| WO | 00/72496 | 11/2000 |
| WO | WO-0072496 | 11/2000 |
| WO | WO 00/76114 | 12/2000 |
| WO | 02/32179 | 4/2002 |
| WO | 02/058314 | 7/2002 |
| WO | 02/093847 | 11/2002 |

(56) References Cited

FOREIGN PATENT DOCUMENTS

| WO | 02/093951 | 11/2002 |
|---|---|---|
| WO | 03/034646 | 4/2003 |
| WO | 2004/042960 | 5/2004 |

OTHER PUBLICATIONS

Office Action from Chinese Application No. 200910001226.2 mailed Oct. 12, 2012, 6 pages.
Office Action from Japanese Application No. 2009-188666 mailed Apr. 30, 2013, 3 pages.
Office Action from Japanese Application No. 2009-188666 mailed Sep. 2, 2011, 7 pages.
Final Office Action from Japanese Application No. 2009-188666 mailed Feb. 4, 2011, 19 pages.
Office Action from Japanese Application No. 2012-000113 mailed Mar. 19, 2013, 3 pages.
Office Action from Taiwanese Application No. 099121594 mailed Mar. 28, 2013, 4 pages.
Office Action from Chinese Application No. 200910001226.2 mailed Aug. 6, 2013, 6 pages.
Office Action from European Application No. 10181279.0 mailed Sep. 4, 2013, 4 pages.
Office Action from Japanese Application No. 2012-000113 mailed Aug. 27, 2013, 4 pages.
Office Action from Norwegian Application No. 20101711 mailed Sep. 21, 2013, 3 pages.
Rejection on Appeal from Japanese Application No. 2009-188666 mailed Oct. 2, 2013, 3 pages.
Office Action from Taiwan Application No. 100142409 mailed Mar. 14, 2014, 5 pages.
Office Action from Norwegian Application No. 20101711 mailed Mar. 25, 2014, 2 pages.
Office Action from Norwegian Application No. 20101711 mailed Oct. 20, 2012, 3 pages.
*Universal Mobile Telecommunications System (UMTS), RRC Protocol Specification*, 3GPP TS 25.331 version 4.0.0 Release 4, Apr. 6, 2001, 38 pages.
Notice of Allowance from U.S. Appl. No. 13/534,561 mailed Jan. 7, 2013, 7 pages.
Office Action from U.S. Appl. No. 13/042,134 mailed Apr. 19, 2011, 7 pages.
Notice of Allowance from U.S. Appl. No. 13/042,134 mailed May 24, 2011, 8 pages.
Notice of Allowance from U.S. Appl. No. 13/042,134 mailed Sep. 14, 2011, 8 pages.
Notice of Allowability from U.S. Appl. No. 13/042,134 mailed Jan. 10, 2012, 5 pages.
Notice of Allowability from U.S. Appl. No. 13/042,134 mailed Jan. 31, 2012, 4 pages.
Notice of Allowance from U.S. Appl. No. 13/042,134 mailed Jun. 1, 2012, 8 pages.
Office Action from U.S. Appl. No. 10/768,211 mailed Sep. 28, 2004, 13 pages.
Notice of Allowance from U.S. Appl. No. 10/768,211 mailed Jun. 15, 2005, 6 pages.
Office Action from U.S. Appl. No. 10/768,223 mailed May 23, 2006, 6 pages.
Office Action from U.S. Appl. No. 10/768,223 mailed Oct. 3, 2005, 13 pages.
Office Action from U.S. Appl. No. 10/768,223 mailed Mar. 13, 2006, 15 pages.
Office Action from U.S. Appl. No. 10/768,312 mailed Jun. 23, 2006, 13 pages.
Notice of Allowance from U.S. Appl. No. 10/768,312 mailed Sep. 25, 2006, 6 pages.
Notice of Allowance from U.S. Appl. No. 10/768,313 mailed Nov. 16, 2006, 7 pages.
Notice of Allowance from U.S. Appl. No. 10/768,313 mailed Aug. 9, 2006, 14 pages.
Notice of Allowance from U.S. Appl. No. 11/656,647 mailed Aug. 12, 2009, 8 pages.
Notice of Allowance from U.S. Appl. No. 11/656,647 mailed Apr. 3, 2009, 7 pages.
Office Action from U.S. Appl. No. 11/656,647 mailed Jul. 25, 2008, 15 pages.
Office Action from U.S. Appl. No. 11/656,647 mailed Nov. 13, 2007, 13 pages.
Notice of Allowance from U.S. Appl. No. 12/648,470 mailed Oct. 20, 2010, 7 pages.
Office Action from U.S. Appl. No. 12/648,470 mailed Jun. 11, 2010, 10 pages.
3GPP, "$3^{rd}$ Generation Partnership Project; Technical Specification Group Radio Access Network; Physical Layer Procedures (TDD) (Release 1999)," 3GPP TS 25.224 V3.6.0 (Mar. 2001).
3GPP, "$3^{rd}$ Generation Partnership Project; Technical Specification Group Radio Access Network; Physical Layer Procedures (TDD) (Release 1999)," 3GPP TS 25.224 V3.8.0 (Sep. 2001).
3GPP, "$3^{rd}$ Generation Partnership Project; Technical Specification Group Radio Access Network; Physical Layer Procedures (TDD) (Release 4)," 3GPP TS 25.224 V4.2.0 (Sep. 2001).
3GPP, "$3^{rd}$ Generation Partnership Project; Technical Specification Group Radio Access Network; Physical Layer Procedures (TDD) (Release 4)," 3GPP TS 25.224 V4.0.0 (Mar. 2001).
3GPP, "$3^{rd}$ Generation Partnership Project; Technical Specification Group Radio Access Network; UTRA High Speed Downlink Packet Access (HSDPA); Overall description; Stage 2 (Release 5)," 3GPP TS 25.308 V5.0.0 (Sep. 2001).
3GPP, "$3^{rd}$ Generation Partnership Project; Technical Specification Group Radio Access Network; Physical Layer Procedures (FDD) (Release 4)," 3GPP TS 25.214 V4.0.0 (Mar. 2001).
3GPP, "$3^{rd}$ Generation Partnership Project; Technical Specification Group Radio Access Network; Physical Layer Procedures (FDD) (Release 1999)," 3GPP TS 25.214 V3.8.0 (Sep. 2001).
3GPP, "$3^{rd}$ Generation Partnership Project; Technical Specification Group Radio Access Network; Physical Layer Procedures (FDD) (Release 1999)," 3GPP TS 25.214 V3.6.0 (Mar. 2001).
3GPP, "$3^{rd}$ Generation Partnership Project; Technical Specification Group Radio Access Network; Physical Layer Procedures (FDD) (Release 4)," 3GPP TS 25.214 V4.2.0 (Sep. 2001).
3GPP, "$3^{rd}$ Generation Partnership Project; Technical Specification Group Radio Access Network; Multiplexing and channel coding (TDD) (Release 4)," 3GPP TS 25.222 V4.1.0 (Sep. 2001).
3GPP, "$3^{rd}$ Generation Partnership Project; Technical Specification Group Radio Access Network; Multiplexing and channel coding (TDD) (Release 4)," 3GPP TS 25.222 V4.0.0 (Mar. 2001).
3GPP, "$3^{rd}$ Generation Partnership Project; Technical Specification Group Radio Access Network; Multiplexing and channel coding (TDD) (Release 1999)," 3GPP TS 25.222 V3.7.0 (Sep. 2001).
3GPP, "$3^{rd}$ Generation Partnership Project; Technical Specification Group Radio Access Network; Multiplexing and channel coding (TDD) (Release 1999)," 3GPP TS 25.222 V3.6.0 (Mar. 2001).
3GPP, "$3^{rd}$ Generation Partnership Project; Technical Specification Group Radio Access Network; UTRAN lub Interface NBAP signaling (Release 1999)," 3GPP TS 25.433 V3.7.0 (Sep. 2001).
3GPP, "$3^{rd}$ Generation Partnership Project; Technical Specification Group Radio Access Network; UTRAN lub Interface NBAP signaling (Release 1999)," 3GPP TS 25.433 V3.5.0 (Mar. 2001).
3GPP, "$3^{rd}$ Generation Partnership Project; Technical Specification Group Radio Access Network; UTRAN lub Interface NBAP signaling (Release 4)," 3GPP TS 25.433 V4.0.0 (Mar. 2001).
3GPP, "$3^{rd}$ Generation Partnership Project; Technical Specification Group Radio Access Network; UTRAN lub Interface NBAP signaling (Release 4)," 3GPP TS 25.433 V4.2.1 (Sep. 2001).
3GPP, "$3^{rd}$ Generation Partnership Project; Technical Specification Group Radio Access Network; RRC Protocol Specification (Release 4)," 3GPP TS 25.331 V4.2.1 (Oct. 2001).
3GPP, "$3^{rd}$ Generation Partnership Project; Technical Specification Group Radio Access Network; RRC Protocol Specification (Release 1999)," 3GPP TS 25.331 V3.6.0 (Mar. 2001).
3GPP, "$3^{rd}$ Generation Partnership Project; Technical Specification Group Radio Access Network; RRC Protocol Specification (Release 4)," 3GPP TS 25.331 V4.0.0 (Mar. 2001).

(56) References Cited

OTHER PUBLICATIONS

3GPP, "3rd Generation Partnership Project; Technical Specification Group Radio Access Network; RRC Protocol Specification (Release 1999)," 3GPP TS 25.331 V3.8.0 (Sep. 2001).
3GPP, "3rd Generation Partnership Project; Technical Specification Group Radio Access Network; MAC protocol specification (Release 4)," 3GPP TS 25.321 V4.2.0 (Sep. 2001).
3GPP, "3rd Generation Partnership Project; Technical Specification Group Radio Access Network; MAC protocol specification (Release 4)," 3GPP TS 25.321 V4.0.0 (Mar. 2001).
3GPP, "3rd Generation Partnership Project; Technical Specification Group Radio Access Network; MAC protocol specification (Release 1999)," 3GPP TS 25.321 V3.9.0 (Sep. 2001).
3GPP, "3rd Generation Partnership Project; Technical Specification Group Radio Access Network; MAC protocol specification (Release 1999)," 3GPP TS 25.321 V3.7.0 (Sep. 2001).
3GPP, "Technical Specification Group GSM EDGE Radio Access Network; General Packet Radio Service (GPRS); Mobile Station (MS)—Base Station System (BSS) interface; Radio Link Control/Medium Access Control (RLC/MAC) protocol (Release 4)," 3GPP TS 44.060 V4.3.0 (Sep. 2001).
3GPP, "Technical Specification Group GSM EDGE Radio Access Network; General Packet Radio Service (GPRS); Mobile Station (MS)—Base Station System (BSS) interface; Radio Link Control/Medium Access Control (RLC/MAC) protocol (Release 4)," 3GPP TS 44.060 V4.1.0 (Apr. 2001).
3GPP, "Technical Specification Group Radio Access Network; Physical layer—Measurements (TDD) (Release 1999)," 3GPP TS 25.225 V3.6.0 (Mar. 2001).
3GPP, "Technical Specification Group Radio Access Network; Physical layer—Measurements (TDD) (Release 1999)," 3GPP TS 25.225 V3.8.0 (Sep. 2001).
3GPP, "Technical Specification Group Radio Access Network; Physical layer—Measurements (TDD) (Release 4)," 3GPP TS 25.225 V4.0.0 (Mar. 2001).
3GPP, "Technical Specification Group Radio Access Network; Physical layer—Measurements (TDD) (Release 4)," 3GPP TS 25.225 V4.2.0 (Sep. 2001).
3GPP, "Technical Specification Group Radio Access Network; UTRAN Iu Interface: General Aspects and Principles (Release 1999)," 3G TS 25.410 V3.3.0 (Dec. 2000).
3GPP, "Technical Specification Group Radio Access Network; UTRAN Iu Interface: General Aspects and Principles (Release 1999)," 3GPP TS 25.410 V3.5.0 (Sep. 2001).
3GPP, "Technical Specification Group Radio Access Network; UTRAN Iu Interface: general aspects and principles (Release 4)," 3GPP TS 25.410 V4.0.0 (Mar. 2001).
3GPP, "Technical Specification Group Radio Access Network; UTRAN Iu Interface: general aspects and principles (Release 4)," 3GPP TS 25.410 V4.2.0 (Sep. 2001).
NHK (Japanese Broadcasting Corporation), "History of Study '90-'99," pp. 68-69 (Apr. 30, 2001).
First Official Action dated Sep. 2, 2014 (+ English translation), in Japanese Patent Application No. 2013-269312, 4 pages.
Extended European Search Report from EP14192732.7 mailed Feb. 27, 2015, 7 pgs.
Search Report for Singapore Patent Application No. 200903146-9 mailed Mar. 25, 2011, 14 pages.
Second Official Action for Japanese Patent Application. No. 2013-269312 mailed Mar. 31, 2015, 4 pages.

\* cited by examiner

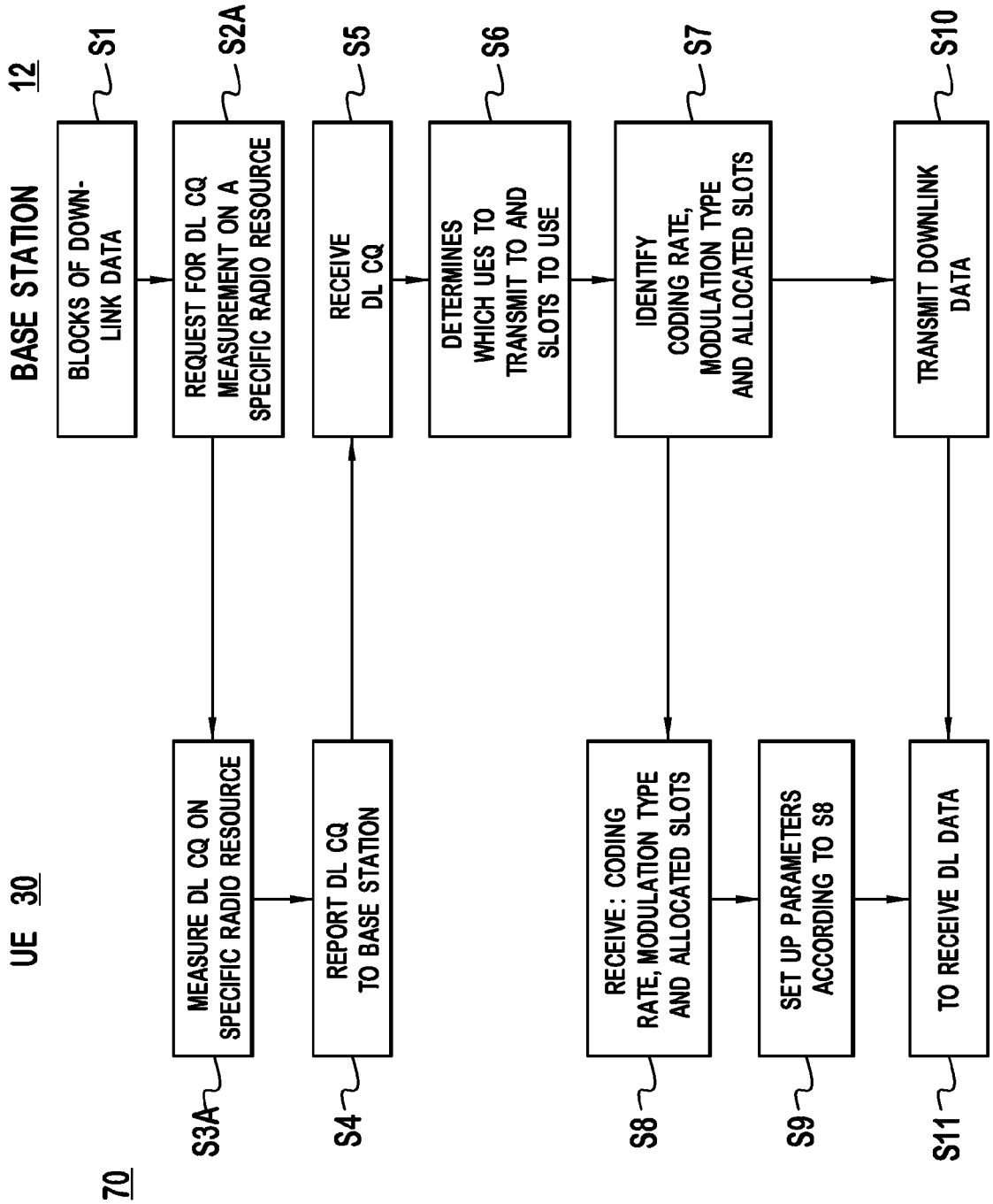

DYNAMIC CHANNEL QUALITY MEASUREMENT PROCEDURE IMPLEMENTED IN A WIRELESS DIGITAL COMMUNICATION SYSTEM TO PRIORITIZE THE FORWARDING OF DOWNLINK DATA

CROSS REFERENCE TO RELATED APPLICATIONS

This application is a continuation of U.S. patent application Ser. No. 13/534,561, filed Jun. 27, 2012, which is a continuation of U.S. patent application Ser. No. 13/042,134, filed Mar. 7, 2011, now U.S. Pat. No. 8,219,036, which is a continuation of U.S. patent application Ser. No. 12/648,470, filed Dec. 29,2009, now U.S. Pat. No. 7,904,026, which is a continuation of 11/656,647, filed Jan. 23, 2007, now U.S. Pat. No. 7,639,989, which is a continuation of 10/768,312, filed Jan. 30, 2004, now U.S. Pat. No. 7,171,163, which is a continuation of U.S. patent application Ser. No. 10/029,569, filed Dec. 21, 2001, now U.S. Pat. No. 6,810,236, which claims the benefit of U.S. Provisional Patent Application No. 60/290,877, filed May 14, 2001, which applications are incorporated herein by reference.

BACKGROUND

The present invention relates to wireless digital communication systems. More particularly, the present invention relates to communication stations which employ code-division multiple access (CDMA) technology. Specifically, the present invention relates to determining radio conditions for use in optimizing radio resource utilization as well as selecting data rates for user services.

In code-division multiple access (CDMA) third generation (3G) cellular telecommunication systems, adaptive modulation and coding (AM&C) techniques are applied to transmissions in order to achieve improved radio resource utilization and provide increased data rates for user services under appropriate conditions. These AM&C techniques take into account radio conditions in advance of transmissions in order to determine modulation and coding rates that take the greatest advantage of current radio propagation conditions utilizing these techniques.

Utilizing these AM&C techniques, a procedure is required that provides a physical channel quality measurement from the receiver in advance of each transmission. Based on this quality measurement, the transmitter determines the appropriate modulation and coding rate for the particular transmission.

In CDMA systems, as with any wireless systems, radio conditions can change rapidly due to a wide variety of both natural and man-made conditions. Since the channel quality measurement is used to determine transmission modulation and coding, and since channel quality changes rapidly due to the changing conditions of the transmission path, the performance of the adaptive transmission process is directly related to the length of the time period between when the channel quality measurement is performed and when the transmission is initiated.

Physical or logical control channels are then used to transfer the channel quality measurements from the receiver to the transmitter. Channel quality signaling may utilize either dedicated control channels to each user equipment (UE) or common control channels shared by all UEs. A UE may be a cellular phone, PDA (personal data assistant) or any other type of wireless device. When dedicated control channels are used, a continuous signaling channel is available over time for propagation of channel quality measurements for each UE. This is an optimal solution for AM&C since the quality measurement is continuously available. Transmissions can occur at any time, taking into account the continuously available quality measurement for appropriate modulation and coding settings. Additionally, with a dedicated control channel always available in the uplink, the channel can be also used to support low rate uplink data transmissions.

The difficulty with the dedicated control channel approach is that physical resources are continuously allocated even when there is no data to transmit. A primary application of AM&C techniques is non-real time high data rate services, for example, Internet access. For these classes of service, the best quality of service (QoS) is achieved with short, high rate transmissions with relatively long idle periods between each transmission. These long idle periods result in an inefficient use of dedicated resources.

The problem can be minimized with pre-configured periodic dedicated channel allocations. But this results in periodic availability of quality measurements. If the quality measurements are not continuously available, for UEs which have transmissions at anyone point in time, only some portion of the UEs will have recent channel quality measurements.

Another alternative is the use of common control channels. With common control channels, a continuous signaling channel exists that is shared between all UEs within the cell. Procedures are defined for determining each UEs access to the common control channel. UE identities are used to distinguish UE specific transactions.

The difficulty with the common control approach for support of AM&C is the large amount of signaling overhead necessary to administrate each UE's access to the control channel. As aforementioned, UE identities are required to distinguish UE specific transactions. Additionally, to avoid contention-based access to the uplink common control channel, individual allocations are required to be signaled on the downlink common control channel for each UE's access. Since uplink transmissions cannot always be predicted, periodic allocations of the uplink control channel must be signaled on the downlink common control channel, which results in considerable signaling overhead. Also, the common control approach does not provide for low rate, uplink data transmissions.

In summary, the efficient performance of AM&C techniques is primarily based on the availability of recent physical channel quality measurements from the receiver in advance of each transmission. Optimally, measurements are available with minimal latency for all users with active data transmissions. The dedicated control channel solution provides continuous measurements, but since transmissions are discontinuous, this is an inefficient use of radio resources. Periodic configured dedicated control channels minimize the radio resource requirement, but this increases measurement latency. The common control channel method can provide measurements on a continuous or periodic basis, but the signaling overhead results in an inefficient use of radio resources.

There exists a need for a system that provides channel quality measurements with low latency and low signaling overhead.

BRIEF DESCRIPTION OF THE DRAWING(S)

The objectives of the present invention will become apparent upon consideration of the accompanying detailed description and figures, in which:

FIG. 2 shows an alternative embodiment of the DCQMP of the present invention shown in FIG. 1.

DETAILED DESCRIPTION OF THE PREFERRED EMBODIMENT(S)

Figure 1:
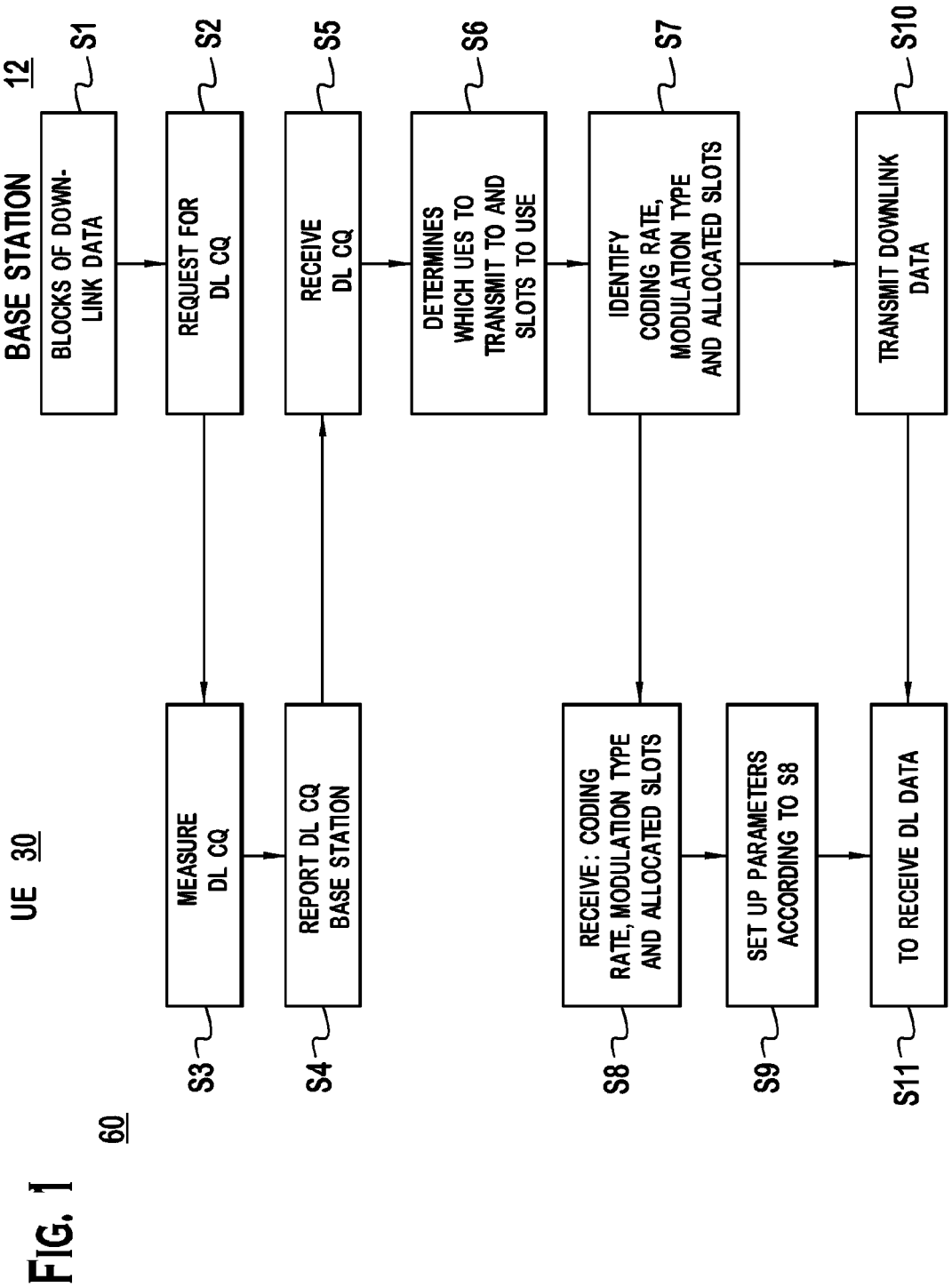
FIG. 1 is a flow chart illustrating one preferred Dynamic Channel Quality Measurement Procedure (DCQMP) of the present invention.

Presently preferred embodiments are described below with reference to the drawing figures wherein like numerals represent like elements throughout.

FIG. 1 is a flow diagram which illustrates the dynamic channel quality (CQ) measurement procedure 60 of the present invention which may be implemented by a wireless digital communication system having a base station/node B (hereinafter base station 12) which communicates with at least one UE 30. Although it is intended for the presently inventive method to support communications between a base station and a plurality of UEs, for simplicity the following description will detail the steps performed by a single UE, it being understood that other UEs will operate in a similar manner.

Blocks of downlink (DL) data are transferred to the base station 12 which are designated for a particular UE 30 (step S1).

The base station 12, responsive to receipt of downlink data and in advance of a transmission to the UE 30, requests DL CQ measurements only from a UE 30 having pending downlink transmissions (step S2).

The UE 30 receives the request and makes the requested CQ measurement at step S3 and reports the DL CQ measurement to the base station 12 at step S4.

Based on the CQ measurement reports received from each UE (step S5), the base station 12 determines which of the UEs will make the best use of radio resources, and determines which slots to use (step S6). Preferably, the UEs are prioritized by their CQ so that the UE with the highest CQ is sent its data first and then the UE with the second highest CQ is sent its data second, and so on until the UE with the lowest CQ is sent its data last.

Since the CQ measurement requests and the responsive CQ measurement reports are only generated when needed, the signaling overhead required for a common control channel is greatly reduced. Measurement reports are available for all active transmitting users, similar to the dedicated control channel case, but avoiding the resource inefficiency during idle periods.

The priority of transmissions is determined according to the DL CQ measurements, and the DL physical channel allocation is signaled to the appropriate UEs, indicating the particular coding rate, modulation type and allocated slots (step S7). The designated UE receives the coding rate, modulation type and allocated slots (step S8), and sets these parameters for reception (step S9).

Blocks of downlink data are then transmitted by the base station 12 to the designated UE 30 (step S10) a given, but short, time after performance of step S7 to enable the UE 30 time to set up for reception. The UE 30 receives the downlink data (step S11) at the specified coding rate, modulation type and in the allocated slots specified at step S7.

The present invention thus provides the fundamental requirements for AM&C operation while maintaining the most efficient use of radio resources. Since DL CQ measurements are available with the minimum possible latency for all transmissions, the choice of the best user(s) to provide service in the next transmission time frame is optimized. Additionally, measurements provided by periodic or continuous mechanisms do not provide increased benefit, performance gain or enhancement over the present invention.

Implementation of the present invention also minimizes measurement processing and the associated power consumption, especially important in the UE, which is typically powered by a small power source of limited capacity, (i.e. a chargeable battery). Since a quality measurement is only requested for a particular active transmission, the number of required measurements are minimized.

In accordance with an alternative embodiment of the method 70 of the present invention shown in FIG. 2, only certain quality measurements may be required depending on the radio resources used for a particular transmission. For example, in the 3G standards, the CQ for only specific physical timeslots may be requested. Therefore, the number of measurements performed is reduced by limiting the requirement of a CQ measurement to only active transmissions and, depending on the scale of the transmission, only requiring measurement on particular radio resources, (i.e., specific time slots). This is shown in FIG. 2, which is similar to FIG. 1 except for modified steps S2A and S3A, which replace steps S2 and S3 respectively of FIG. 1. In step S2A, the base station 12 requests the UE 30 to perform a measurement only on a particular radio resource. In response, the UE performs the DL CQ measurement on the specified radio resource (step S3A).

The present invention provides many advantages over prior art schemes. First, the invention provides the highest efficiency utilization of the air interface since only those UEs having pending transmissions will be required to respond to a request for DL CQ measurements. This permits the overhead signaling to be at a minimum.

Second, since the transmissions are prioritized according to the highest quality DL CQ measurements, the highest data rates permissible will be achieved for each time slot or multiple time slots.

Third, since UEs are only required to respond to the request for the DL CQ measurements, unnecessary measurements by the UEs will not be required, thereby saving the battery life of the UEs.

A final advantage of the present invention is the increased number of users that may be supported in a cell for both of the methods disclosed herein. The number of users that are supported is limited in the dedicated control channel method by the requirement for dedicated radio resources; and in the common control channel method by signaling overhead requirements. By limiting the measurement signaling procedures to active users, the present invention minimizes the common control signaling overhead and supports the greatest number of users in the cell.

While the present invention has been described in terms of the preferred embodiment, other variations which are within the scope of the invention as outlined in the claims below will be apparent to those skilled in the art.

What is claimed is:

1. A user equipment (UE), comprising:
a receiver operable using radio resources to receive a non-periodic request from a base station to provide channel quality information (CQI) regarding specific radio resources as a subset of the radio resources, wherein the request is to be transmitted to the UE;
a transmitter to transmit channel quality information with respect to the specific radio resources that are the subset of the radio resources in response to the non-periodic request;

wherein the receiver is operable to receive a coding rate and an allocation of the radio resources from the base station, wherein the coding rate is based on the channel quality information, and wherein the allocation of radio resources is based on a prioritization of UEs based on the channel quality information received from the UEs; and wherein the receiver is operable to receive downlink data via the subset of radio resources based on the coding rate and the allocation of the radio resources received from the base station, wherein UEs with a higher channel quality receive the downlink data before UEs with lower channel quality.

2. The user equipment of claim 1, wherein the receiver is operable to receive a request to provide one of a number of types of channel quality information.

3. The user equipment of claim 2, wherein a first type of channel quality information comprises the channel quality information regarding the subset of the radio resources.

4. The user equipment of claim 2, wherein a second type of channel quality information comprises channel quality information regarding the entire radio resources.

5. The user equipment of claim 1:
wherein the receiver is operable to receive a non-periodic request to provide a channel quality information in respect of the subset of radio resources; and
the transmitter is operable to transmit channel quality information with respect to the specific radio resources that are the subset of the radio resources response to the non-periodic request based on the UE having pending downlink transmissions.

6. A user equipment (UE), comprising:
a receiver operable using radio resources to receive a first type of non-periodic request from a base station to provide channel quality data regarding specific radio resources as a subset of the radio resources, the first type of non-periodic request being one of a plurality of types of requests for channel quality data, wherein the first type of non-periodic request is to be transmitted to the UE;
a transmitter to transmit channel quality data with respect to the specific radio resources that are the subset of the radio resources in response to the first type of non-periodic request;
wherein the receiver is operable to receive a coding rate and an allocation of the radio resources from the base station, wherein the coding rate is based on the channel quality data, and wherein the allocation of radio resources is based on a prioritization of UEs based on the channel quality data received from the UEs; and
wherein the receiver is operable to receive downlink data via the subset of radio resources based on the coding rate and the allocation of the radio resources received from the base station, wherein UEs with a higher channel quality receive the downlink data before UEs with lower channel quality.

7. The user equipment of claim 6, wherein the receiver is operable to receive downlink transmission parameters associated with the downlink data.

8. The user equipment of claim 7, wherein the downlink transmission parameters comprise one or more of modulation type, the coding rate, and timeslot(s).

9. The user equipment of claim 6, wherein the first type of non-periodic request for the channel quality data comprises a request for channel quality data regarding a subband of the radio resources.

10. The user equipment of claim 9, wherein a second type of non-periodic request for the channel quality data comprises a request for channel quality data regarding the entirety of the radio resources.

11. A base station for establishing a downlink channel with a user equipment (UE), the base station comprising:
a transmitter using radio resources to output a first type of non-periodic request from the base station for a downlink channel quality measurement report regarding specified radio resources as a subset of the radio resources, wherein the non-periodic request is to be transmitted to the UE;
a receiver to receive the requested downlink channel quality measurement report regarding the specified radio resources that are the subset of the radio resources and in response to the non-periodic request;
wherein the transmitter is operable to output a coding rate and an allocation of the radio resources to the UE, wherein the coding rate is based on the requested downlink channel quality measurement report regarding the specified radio resources, and wherein the allocation of radio resources is based on a prioritization of UEs based on the requested downlink channel quality measurement report regarding the specified radio resources as received at the base station from the UE; and
wherein the transmitter is operable to establish the downlink channel with the user equipment in response to the received downlink channel quality measurement report based on the coding rate and the allocation of the radio resources outputted from the base station, wherein UEs with a higher channel quality receive downlink data before UEs with lower channel quality.

12. The base station of claim 11, wherein the first type of non-periodic request is associated with a subset of the specified radio resources.

13. The base station of claim 11, wherein the first type of non-periodic request is associated with the entirety of the radio resources.

14. The base station of claim 11, wherein the transmitter, responsive to the receiver receiving the downlink channel quality measurement report, is operable to output a downlink physical channel allocation of radio resources for transmission to the user equipment for use in receiving downlink data via the downlink channel.

15. The base station of claim 14, wherein the downlink physical channel allocation of radio resources comprises at least one of a specified coding rate, modulation type, and allocated timeslot(s).

16. A user equipment (UE), comprising:
a receiver operable using radio resources to receive a non-periodic request form a base station to provide a channel quality (CQ) measurement report regarding specified radio resources as a subset of the radio resources, wherein the request is to be transmitted to the UE;
a transmitter to transmit the CQ measurement report with respect to the specific radio resources that are the subset of the radio resources in response to the non-periodic request;
wherein the receiver is operable to receive a coding rate and an allocation of the radio resources from the base station, wherein the coding rate is based on the CQ measurement report, and wherein the allocation of radio resources is based on a prioritization of UEs based on the CQ measurement report received from the UEs; and
wherein the receiver is operable to receive downlink data via the subset of radio resources based on the coding rate and the allocation of the radio resources received from the base station, wherein UEs with a higher channel quality receive the downlink data before UEs with lower channel quality.

17. The user equipment of claim 16, wherein the non-periodic request to provide the CQ measurement report comprises a scheduled request to provide the CQ measurement report regarding scheduled radio resources.

18. The user equipment of claim 17, wherein the scheduled radio resources comprise specified radio resources.

19. The user equipment of claim 17, wherein the scheduled radio resources comprise at least one specific time slot.

20. The user equipment of claim 16:
wherein a first type of the non-periodic request from the base station for the CQ measurement report comprises a request for information regarding a subband of the radio resources; and
wherein a second type of the non-periodic request from the base station for the CQ measurement report comprises a request for information regarding the entirety of the radio resources.

* * * * *